(No Model.)  3 Sheets—Sheet 1.
W. HARGROVE.
TREADLE POWER.
No. 425,571.  Patented Apr. 15, 1890.
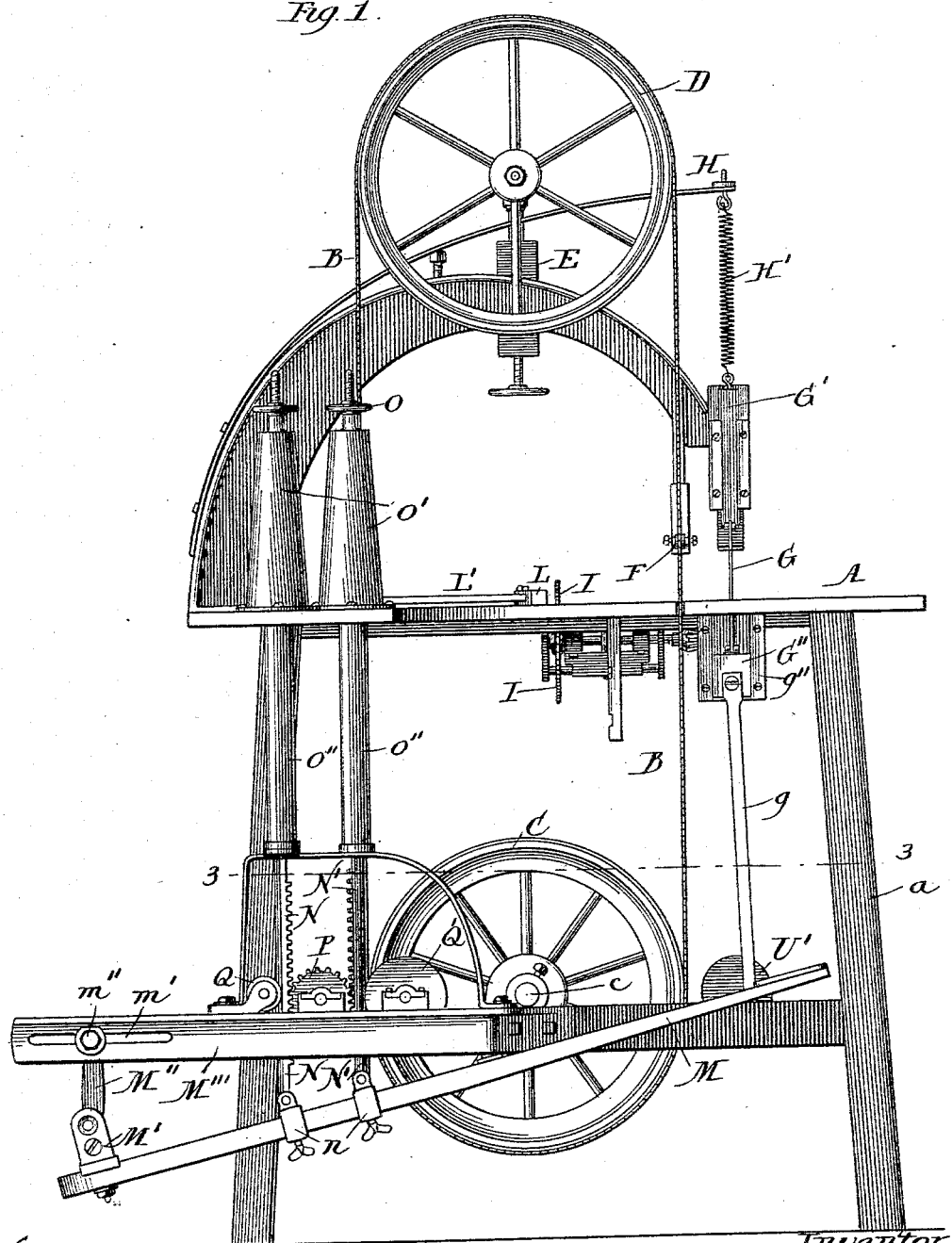
Witnesses:
Fred Berlach.
Harry T. Jones.
Inventor:
William Hargrove

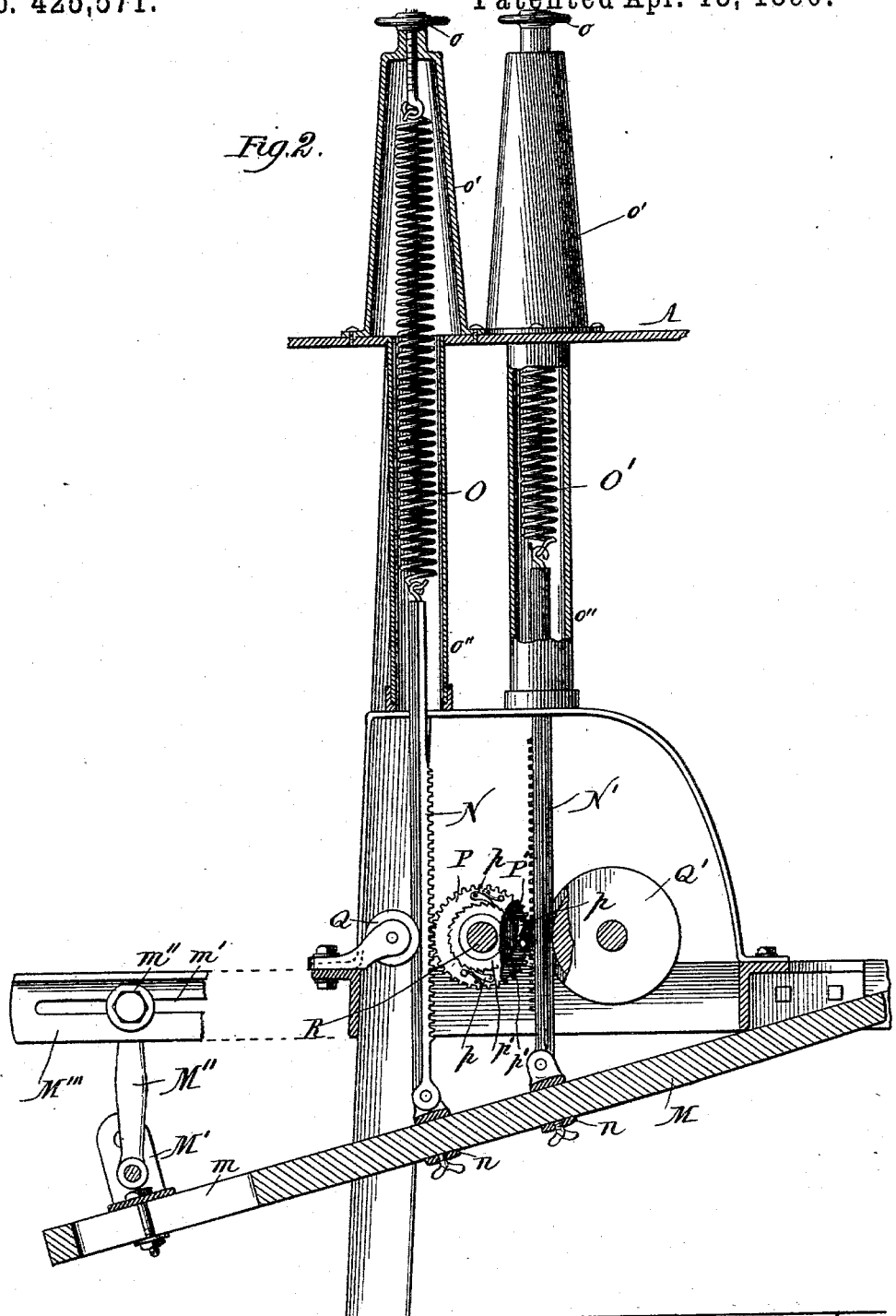

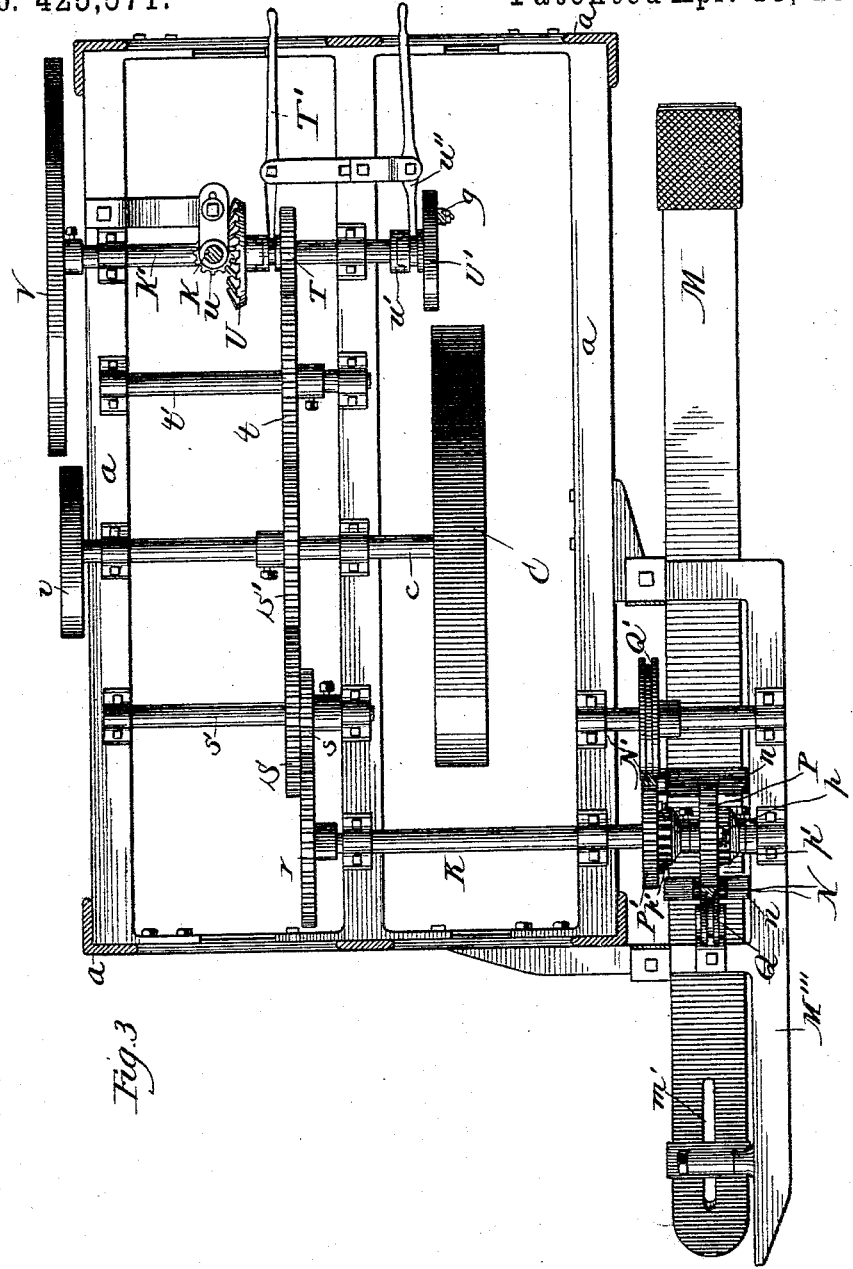

UNITED STATES PATENT OFFICE.

WILLIAM HARGROVE, OF CHICAGO, ILLINOIS, ASSIGNOR TO HIMSELF AND JAMES FITZSIMMONS, OF SAME PLACE.

TREADLE-POWER.

SPECIFICATION forming part of Letters Patent No. 425,571, dated April 15, 1890.

Application filed June 12, 1889. Serial No. 314,046. (No model.)

*To all whom it may concern:*

Be it known that I, WILLIAM HARGROVE, residing at Chicago, in the county of Cook and State of Illinois, and a citizen of the United States, have invented a new and useful Improvement in Treadle-Powers, of which the following is a specification, reference being had to the accompanying drawings, in which—

Figure 1 is a front elevation of a sawing-machine provided with my improved treadle-power. Fig. 2 is an enlarged detail, being a side elevation, partly in section, of the treadle-driving mechanism. Fig. 3 is a horizontal section on the line 3 3 of Fig. 1.

This invention relates to motors or treadle powers, and is especially designed to be applied in driving a sawing-machine.

The object of the invention is to provide a treadle-power which will not have a dead-center point and which will drive the machine on the ascent of the treadle as well as on the descent.

In the drawings, A represents the table of a sawing-machine, provided with suitable mountings for a band-saw, a circular saw, and a jig-saw.

B is the band-saw.

C and D are the band-saw wheels.

E is a guide-block for the upper wheel.

F is a grooved wheel or roller which forms the guide for the band-saw.

G is a jig-saw attached to a sliding block G', provided with springs H H'.

I is a circular saw.

K K are shafts.

L is a guide for the circular saw.

M is a treadle. This treadle M has an arm M' secured to its rear end by a bolt which passes through a slot $m$ in the treadle, which is pivoted to an arm M'', which descends from an arm M''', extending out from the framework $a$. The depending arm M'' is secured to the arm M''' by a bolt $m''$, which passes through a slot $m'$ in the arm M'''.

N N' are two vertical racks, each secured to the treadle M by an adjustable clamp $n$.

O O' are two coiled springs, to which the upper ends of the racks N N', respectively, are secured, as shown in Fig. 2. The upper ends of the springs O O' are each secured to a bolt $o$, which is screwed into the top of an inclosing-support $o'$, which supports $o'$ are supported upon the table A, as shown in Fig. 1. The lower portions of the springs O O' are inclosed in tubes $o''$ $o''$, depending from the table.

By means of the clamps $n$ the racks N N' can be secured to the treadle M in proper position. The length of leverage of the treadle M can be adjusted by moving the bolt $m''$ in the slot $m'$ in the arm M''' and by moving the arm M' on the treadle M, the clamps $n$ being moved to keep the racks N N' in proper position.

P P' are two wheels, which are loosely mounted upon a shaft R, and which are engaged by the racks N N', respectively, the racks N N' being on opposite sides of the shaft R. Each wheel P P' is provided with one or more pawls $p$, which engage with a ratchet-wheel $p'$, secured on the shaft R near each wheel P P', so that when the treadle M is pressed downward the rack N' and wheel P' will drive its pawls $p$ and ratchet-wheel $p'$ forward, and when the treadle and racks N N' are raised by the springs O O' the rack N and wheel P will drive its pawls $p$ and ratchet-wheel $p'$ forward, thereby continually driving the shaft R in one direction. The tension of the springs O O' may be adjusted by the bolts $o$ as may be desired or necessary to raise the racks and drive the shaft R.

Q Q' are two wheels or rollers which keep the racks N N', respectively, in engagement with their respective wheels P P'.

As shown in Fig. 3, on the inner end of the shaft R is a gear-wheel $r$, which meshes with a gear-wheel $s$ on a shaft $s'$, on which shaft is a gear-wheel S, which meshes with a gear-wheel S' on the shaft $c$, on which the band-saw-driving wheel C is mounted. A gear-wheel $t$, mounted on a shaft $t'$, meshes with the gear-wheel S', and also with a gear-wheel T, loosely mounted upon a shaft K'. This gear-wheel T is provided with a lever T' for throwing it into and out of engagement with the wheel $t$, and is also provided with a clutch which engages with a clutch on a bevel gear-wheel U, secured on the shaft K'. The bevel gear-wheel U meshes with a bevel-pinion $u$ on the vertical shaft K, which drives the circular saw I. The inner end of the shaft K′ is provided with a clutch $u'$, which engages with a clutch on a wheel U′, which drives the pitman $g$ of the jig-saw G. The clutch $u'$ may be thrown into or out of engagement with the clutch of the wheel U′ by a lever $u''$ to start or stop the jig-saw.

V is a fly-wheel secured on the outer end of the shaft K′.

$v$ is a pulley on the outer end of the shaft $c$.

The shaft R, which is driven by the treadle M, racks N N′, and wheels P P′, pawls $p$, and ratchet $p'$, drives the gearing for the saws, as above described, so that the operator may use either the band-saw B, or the circular saw I, or the jig-saw G.

The saws may be driven by a band running over the pulley $v$ whenever it is desired. In such case the spring-pawls $p$ may be thrown out of engagement with the ratchet-wheels $p'$, if desired.

The driving-gear for the jig and circular saws may be stopped by throwing the wheel T out of engagement with the wheel $t$ by the lever T′.

The saws are driven by the same force on the upward movement as on the downward movement of the treadle M. There is no dead-center and no lost motion in this improved treadle-power or motor, which can be readily applied to any machine which it is desired to drive by foot or treadle power.

What I claim as new, and desire to secure by Letters Patent, is—

1. The combination, with the shaft R, provided with a driving-gear, of the gear-wheels P P′, loosely mounted on said shaft and provided with pawls $p\ p$, the ratchet-wheels $p'\ p'$, secured to said shaft, the vertical racks N N′, located on opposite sides of the shaft R and engaged, respectively, with the gears P P′, the treadle M, connected with the lower ends of said racks, and the springs O O′, to which the upper ends of the racks are attached, whereby the shaft R is continually driven in one direction and with equal force on the up-and-down stroke of the treadle, substantially as described.

2. The combination, with the shaft R, the racks N N′, intermediate gearing connecting said shaft and racks, and the treadle M, connected with the lower ends of said racks, of the arm M′′′, having slot $m'$, the pivoted adjustable arms M′ M′′, and the bolt $m''$, substantially as shown and described.

3. The combination, with the shaft R and driving-gearing, of the two vertically-moving racks N N′, the gearing connecting said racks with the shaft R, the adjustable springs O O′, attached to the upper ends of the racks, and the treadle M, connected with the lower ends of said racks, substantially as described.

WILLIAM HARGROVE.

Witnesses:
HARRY T. JONES,
ELLA NEMETT.